(12) United States Patent
Shishido et al.

(10) Patent No.: US 6,314,077 B1
(45) Date of Patent: Nov. 6, 2001

(54) DISK DRIVE

(75) Inventors: Yuji Shishido; Takashi Mochida, both of Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/295,385

(22) Filed: Apr. 21, 1999

(30) Foreign Application Priority Data

Apr. 23, 1998 (JP) .................................................. 10-113576

(51) Int. Cl.$^7$ .................................................. G11B 17/00
(52) U.S. Cl. .......................................................... 369/263
(58) Field of Search .................................... 369/176, 215, 369/219, 244, 247, 249, 251, 254, 258, 263, 264, 270; 360/98.07, 98.08, 99.04; 74/573 R; 451/343

(56) References Cited

U.S. PATENT DOCUMENTS

| 4,561,035 | 12/1985 | McDorman et al. . | |
|---|---|---|---|
| 5,391,952 | 2/1995 | Simazu et al. | ......................... 310/67 |
| 5,479,386 | * 12/1995 | Takeshita et al. | ................. 369/44.14 |
| 5,811,678 | 9/1998 | Hirano . | |
| 6,005,311 | * 12/1999 | Matsushima | ............................ 310/51 |
| 6,005,749 | 12/1999 | Ikuta et al. | ........................ 360/99.12 |
| 6,065,368 | * 5/2000 | Sohn | .................................. 74/573 R |
| 6,155,134 | * 12/2000 | Ikuta et al. | .......................... 74/573 R |
| 6,178,156 | * 1/2001 | Kuwajima et al. | ................... 369/263 |
| 6,205,110 | * 3/2001 | Miyamoto et al. | ................... 369/266 |
| 6,212,973 | * 4/2001 | Sohn | .................................. 74/573 R |

FOREIGN PATENT DOCUMENTS

| 0 718 839 | 6/1996 | (EP) . |
|---|---|---|
| 0 718 839 A2 | 6/1996 | (EP) . |
| 03069060 | 3/1991 | (JP) . |
| 9-161394 | 6/1997 | (JP) . |

* cited by examiner

Primary Examiner—David L. Ometz
Assistant Examiner—Franklin D. Altman, III
(74) Attorney, Agent, or Firm—Ronald P. Kananen; Rader, Fishman & Grauer

(57) ABSTRACT

A disk drive includes a drive unit including a mechanical chassis, a spindle motor for rotating a turn table on which a recording medium disk is supported, and a pickup movable in the radial direction of the recording medium disk supported by the turn table for reproducing and/or recording signals from and/or in the recording medium disk; a base chassis for supporting the drive unit via an elastic body; a self-aligning mechanism including a holder rotatable together with a rotor portion of the spindle motor and a balance member movable in the holder; and a counter weight disposed at a position suitable to allow the center of gravity of the drive unit to be located in conformity to or in proximity to the rotational center of the spindle motor.

6 Claims, 6 Drawing Sheets

PRIOR ART

FIG. 7

DISK DRIVE

BACKGROUND OF THE INVENTION

The present invention relates to a new disk drive, and particularly to a disk drive in which a self-aligning mechanism for canceling an unbalance of a recording medium disk is provided in a rotation drive portion for rotating the recording medium disk, wherein the self-aligning mechanism is improved to certainly achieve the function thereof.

Figure 1:
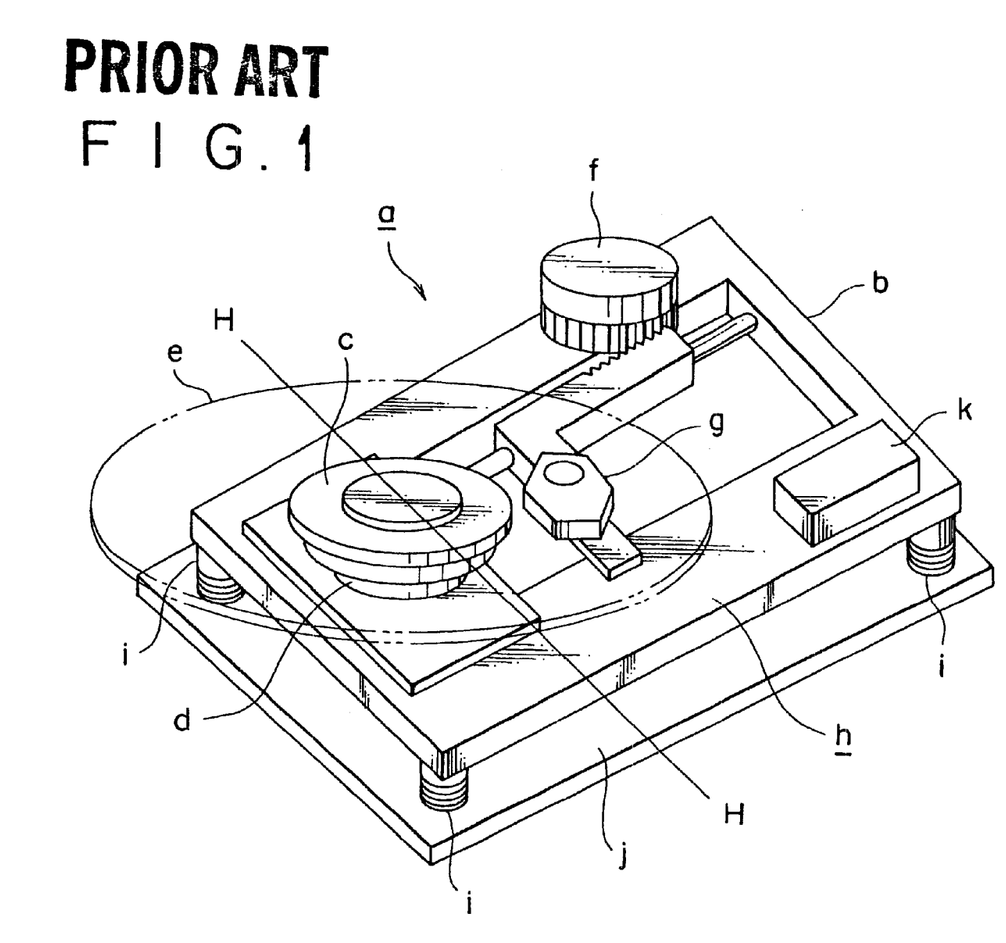
FIG. 1 is a schematic perspective view showing a related art disk drive.
Figure 2:
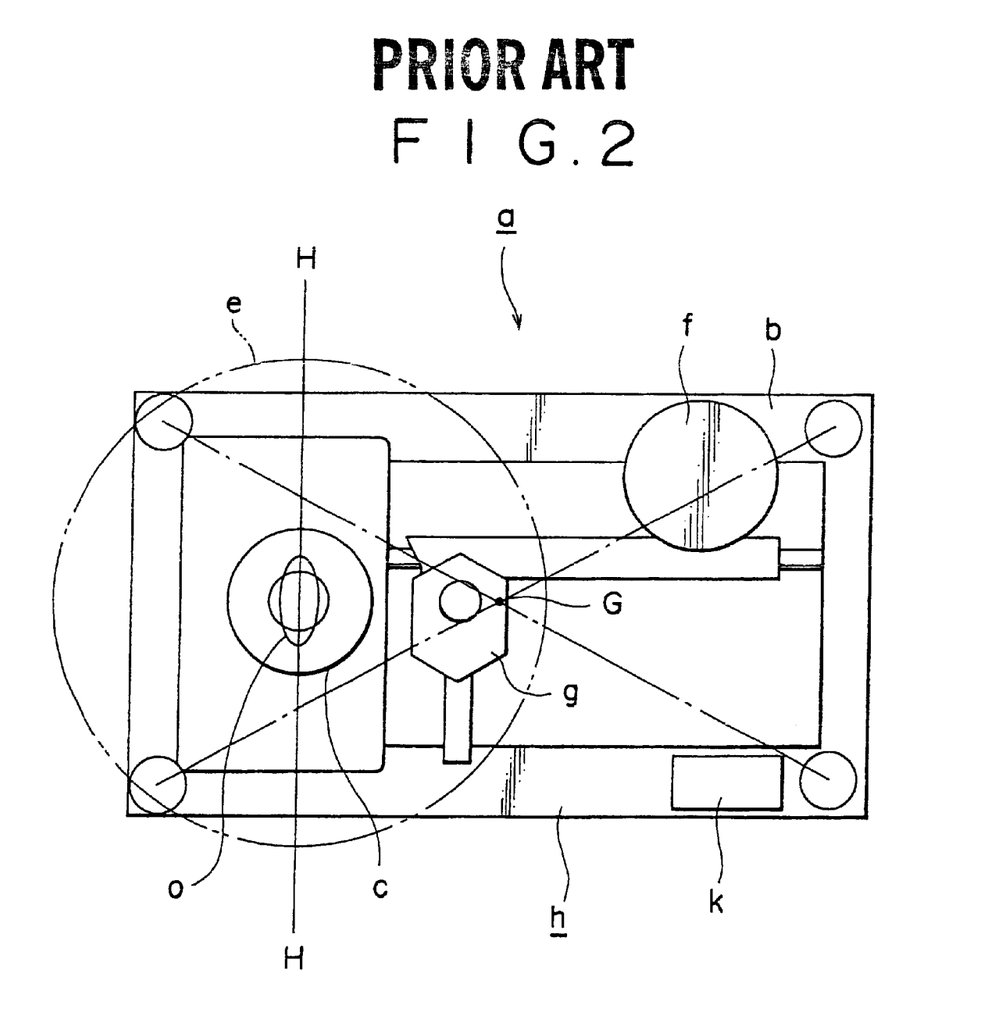
FIG. 2 is a schematic plan view of the related art disk drive.

The schematic configuration of one example of a related art disk drive is shown in FIGS. 1 and 2.

A disk drive "a" includes a mechanical chassis "b" on which necessary members and parts are mounted.

A spindle motor "d" for rotating a turn table "c" is disposed on one end portion of the mechanical chassis "b". An optical disk "e" is supported on the turn table "c" and is rotated by the spindle motor "d" together with the turn table "c". An optical pickup llgll is disposed on the mechanical chassis "b", which pickup is moved by a thread motor "f" in the radial direction of the optical disk "e" supported on the turn table "c". A drive unit "h" is configured by the mechanical chassis "b" on which necessary members and parts are disposed as described above. The drive unit "h" is mounted on a base chassis "j" via elastic bodies "i". The optical disk "e" is disposed in an unbalance state, that is, in a state in which the center of gravity is not positioned at the center of the mechanical chassis "b", and accordingly, when the optical disk "e" is rotated at a high speed, there occurs vibration. The reason why the elastic bodies "i" are interposed between the drive unit "h" and the base chassis "j" is to prevent such vibration caused by high speed rotation of the optical disk "e" from being transmitted to the outside of the disk drive "a".

A counter weight "k" is mounted on the mechanical chassis "b" on the side, on which the optical pickup "g" and thread motor "f" are disposed, with respect to a horizontal line H—H passing through the rotational center of the optical disk "e", that is, the rotational center "O" of the spindle motor "d".

The spindle motor "d" has a self-aligning mechanism.

Figure 3:
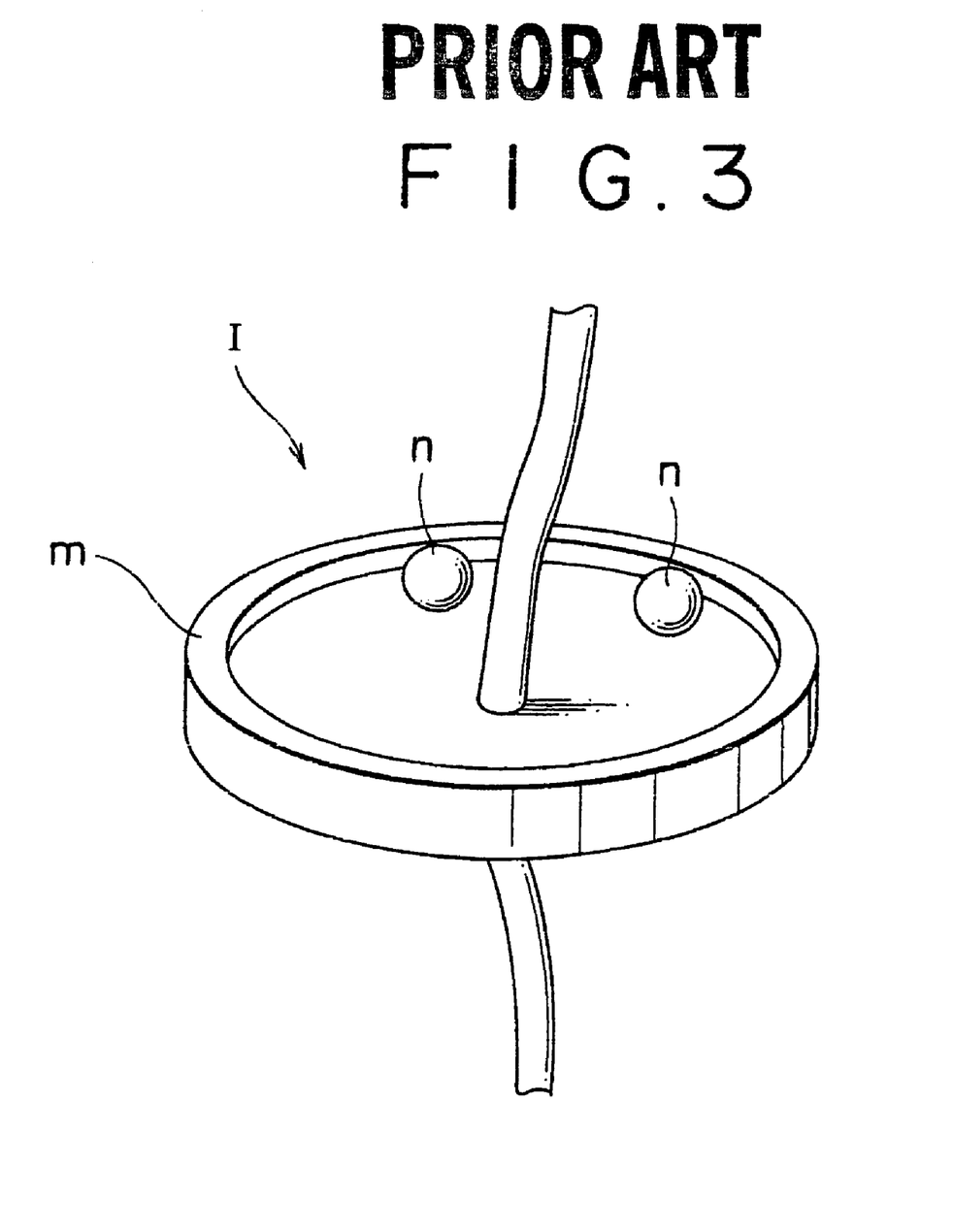
FIG. 3 is a view illustrating the principle of a self-balancing device.

The self-aligning mechanism of the spindle motor "d" functions on the basis of the following principle:

FIG. 3 shows a self-balancing device I as one example of the automatic self-aligning mechanism. The self-balancing device "I" includes a holder "m" having an annular race portion, and a plurality of balls "n" freely movable on the holder "m".

In the case where the optical disk "e" supported on the turn table "c" in the unbalanced state is rotated at a frequency higher than a resonance frequency of a vibration system composed of the drive unit "h" and the elastic bodies "i", the drive unit "h" is vibrated with its phase delayed approximately 180° from the phase of the unbalance of the optical disk "e". Since the balls "n" are automatically moved in the direction in which the drive unit "h" is vibrated, that is, moved on the reversed phase side to the unbalance of the optical disk "e", the balance of the drive unit "h" is automatically kept by the movement of the balls "n".

If the drive unit "h" is vibrated by rotation of the optical disk "e" disposed in the unbalanced state, not only readout or writing of signals in or from the optical disk "e" may be not sufficiently performed but also the vibration, if it is transmitted to the outside of the disk drive "a", may exert adverse effect on the peripheral environment, for example, may induce vibration of peripheral equipment such as a hard disk drive, leading to malfunction thereof. However, the self-aligning mechanism provided on the spindle motor "d" makes it possible to prevent the above-described adverse effect.

Incidentally, in the related art disk drive "a", the counter weight "k" is mounted on the mechanical chassis "b" on the side, on which the optical pickup "g" and thread motor "f" are disposed, with respect to the horizontal line H—H passing through the rotational center of the optical disk "e", that is, the rotational center "O" of the spindle motor "d". The reason for this is as follows:

The position of the center of gravity G of the entire drive unit "h" is determined depending on the arrangement of the optical pickup "g", thread motor "f" and the like mounted thereon and the shape of the mechanical chassis "b" itself.

In the case where the center of gravity G is not positioned at the center of the drive unit "h", there occurs an inconvenience that if the mechanical chassis "b" is made from a resin material having a poor rigidity, the mechanical chassis "b" is largely distorted by vibration caused by high speed rotation of the optical disk "ee"disposed in the unbalanced state, with a result that the optical pickup "g" cannot correctly read information stored in the optical disk "e". This is due to the fact that there occurs a difference in vibration amplitude and vibration phase between the right and left sides of the mechanical chassis "b" resulting from the shifting of the center of gravity G from the center of the mechanical chassis "b", so that the mechanical chassis "b" is twisted. Accordingly, in order to shift the center of gravity G of the drive unit "h" to the center of the drive unit "h" itself, the counter weight "k" is disposed at the above-described position.

However, when the center of gravity G of the drive unit "h" is largely shifted from the rotational center "O" of the optical disk "e" as in the related art disk drive "a", vibration resulting from unbalance of the optical disk "e", that is, the orbit of vibration of the axis resulting therefrom becomes an elliptical orbit designated by symbol "o" in FIG. 2. The reason for this is that since the vibrational input is offset from the center of gravity, there occurs vibration of 2 degrees of freedom, because the system has both parallel vibration and rotational vibration.

If the orbit of vibration of the axis becomes an elliptical orbit, the operation of the self-aligning mechanism becomes unstable, failing to sufficiently achieve the performance thereof.

Further, as in the disk drive "a", even if the counter weight "k" is not provided, the center of gravity of the drive unit "h" is shifted from the rotational center of the spindle motor "d" to the side on which the optical pickup "g", thread motor "f" and the like are disposed, with a result that the orbit of vibration caused by high speed rotation of the optical disk "e" disposed in the unbalanced state becomes an elliptical orbit and thereby the self-aligning mechanism also fails to sufficiently achieve the performance thereof.

Accordingly, in the conventional disk drive, the self-alignment mechanism fails to sufficiently achieve the performance thereof irrespective of provision of the counter weight "k". This obstructs the rotational speed of a recording medium disk from being increased for making fast the transfer speed of data.

SUMMARY OF THE INVENTION

An object of the present invention is to provide a disk drive allowing a self-alignment mechanism to sufficiently achieve the performance thereof by making the center of gravity of a drive unit close to the rotational center of a recording medium disk.

To achieve the above object, according to the present invention, there is provided a disk drive including: a drive unit including a mechanical chassis, a spindle motor for rotating a turn table on which a recording medium disk is supported, and a pickup movable in the radial direction of the recording medium disk supported by the turn table for reproducing and/or recording signals from and/or in the recording medium disk; a base chassis for supporting the drive unit via an elastic body; a self-aligning mechanism including a holder rotatable together with a rotor portion of the spindle motor and a balance member movable in the holder; and a counter weight disposed at a position suitable to allow the center of gravity of the drive unit to be located in conformity to or in proximity to the rational center of the spindle motor.

Accordingly, in the disk drive of the present invention, since the center of gravity of the drive unit is located in conformity to or in proximity to the rotational center of the spindle motor, the orbit of vibration of the rotational center of a recording medium disk becomes an orbit substantially having a circular shape. As a result, a force caused by vibration of the drive unit is made stable in any phase direction, so that the balance member can be readily moved to such a position as to cancel the unbalance, that is, to an equilibrium position.

This makes it possible to readily cancel or reduce vibration caused by high speed rotation of the recording medium disk disposed in the unbalanced state, and hence to allow the recording medium disk to be rotated at a high speed, thereby making fast the transfer speed of data.

The above counter weight is preferably disposed on the mechanical chassis. With this configuration, it is possible to dispose the counter weight readily, and to allow the center of gravity of the drive unit to be easily close to the rotational center of the spindle motor.

Preferably, the holder of the self-aligning mechanism is a ring-like housing, and the balance member is a plurality of balance balls movably disposed in the housing. With this configuration, it is possible to simplify the configuration of the self-aligning mechanism.

DESCRIPTION OF THE PREFERRED EMBODIMENT

Hereinafter, one embodiment of a disk drive according to the present invention will be described with reference to the accompanying drawings.

In the embodiment shown in the figures, the present invention is applied to an optical disk drive for recording and/or reproducing information in and/or from an optical disk.

Figure 4:
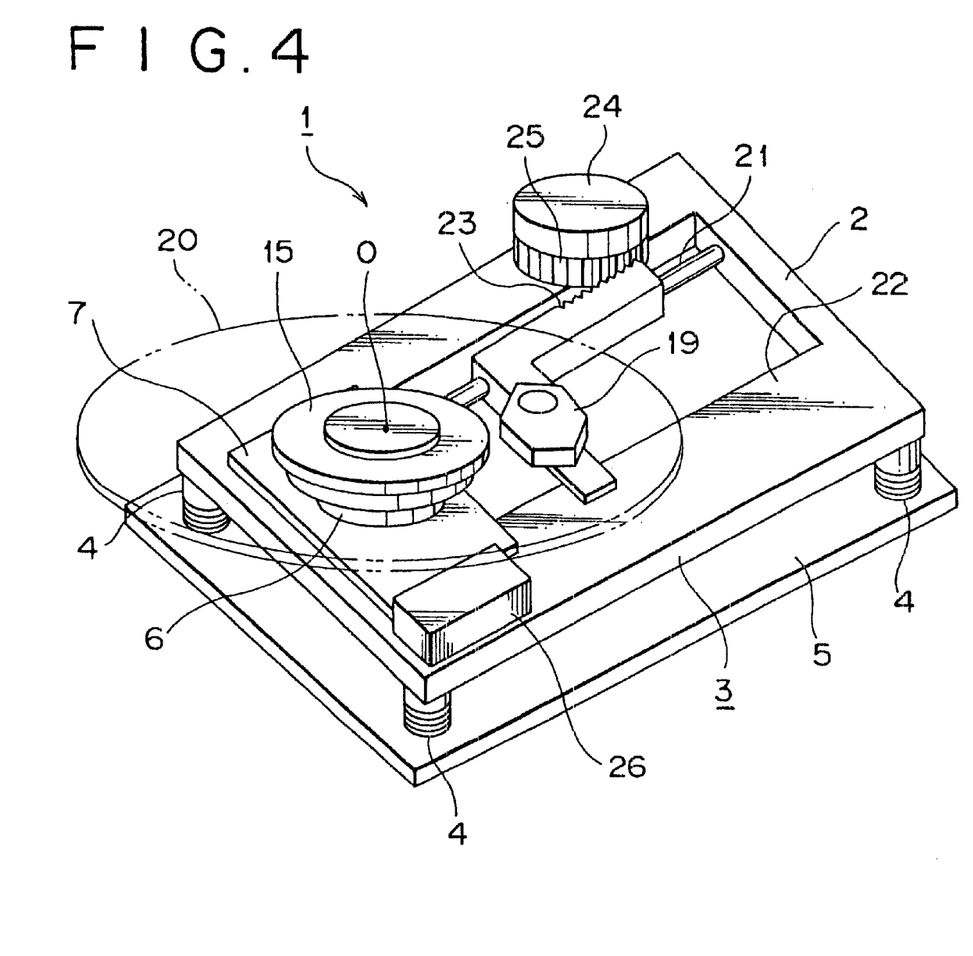
FIG. 4 is a schematic perspective view showing one embodiment of a disk drive of the present invention.

As shown in FIG. 4, an optical disk drive 1 is configured such that a drive unit 3 composed of a mechanical chassis 2 on which necessary members and parts are mounted is mounted on a base chassis 5 via elastic bodies (dampers) 4.

A spindle motor 6 is fixed on an end portion of the mechanical chassis 2 via a stator board 7.

Figure 5:
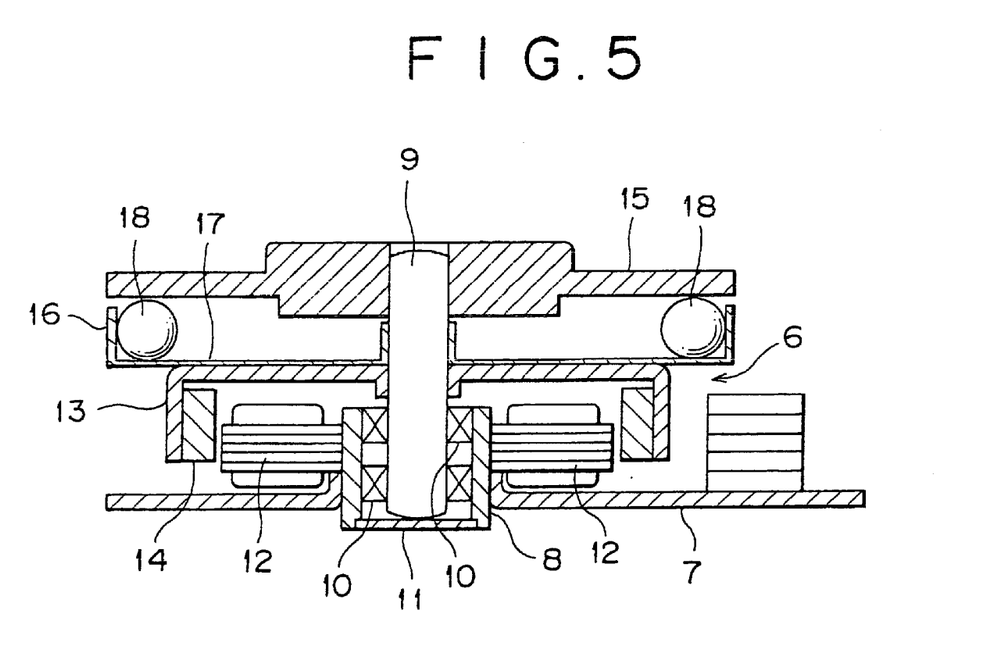
FIG. 5 is an enlarged vertical sectional view of a rotation drive portion of the disk drive.

As shown in FIG. 5, a cylindrical shaft supporting portion 8 is fixed in the stator board 7, and a spindle shaft 9 is rotatably supported by the shaft supporting portion 8 via bearings 10. The lower end of the spindle shaft 9 is supported by a thrust bearing 11 mounted to the shaft supporting portion 8. A stator coil 12 is fixed to the stator board 7 in such a manner as to surround the shaft supporting portion 8.

A rotor yoke 13 made from a magnetic material is fixed to the spindle shaft 9 in such a manner that a peripheral wall portion thereof surrounds the outer side of the stator coil 12. A rotor magnet 14 is fixed on the inner surface of the peripheral wall portion of the rotor yoke 13 in such a manner as to face toward the stator coil 12. With this configuration, when a current is applied to the stator coil 12, the rotor yoke 13 is rotated, and the spindle shaft 9 to which the rotor yoke 13 is fixed is rotated.

A turn table 15 is fixed on the upper end portion of the spindle shaft 9.

A self-aligning mechanism 16 is provided between the rotor yoke 13 and turn table 15. The self-aligning mechanism 16 includes a housing 17 and a plurality of balance balls 18 movably contained in the housing 17. The housing 17 is formed by a dish-like member fixed on the spindle shaft 9, and the upper surface of the housing 17 is blocked by the turn table 15.

An optical pickup 19 is located on the mechanical chassis 2 and is supported by guides 21 and 22 in such a manner as to be movable in the radial direction of the optical disk 20 supported on the turn table 15.

A rack gear 23 is provided on the optical pickup 19. The rack gear 23 is fed by a pinion gear 25 rotated by a thread motor 24 fixed on the mechanical chassis 2, so that the optical pickup 19 is moved in the radial direction of the optical disk 20 supported on the turn table 15 while being guided by the guides 21 and 22.

Figure 6:
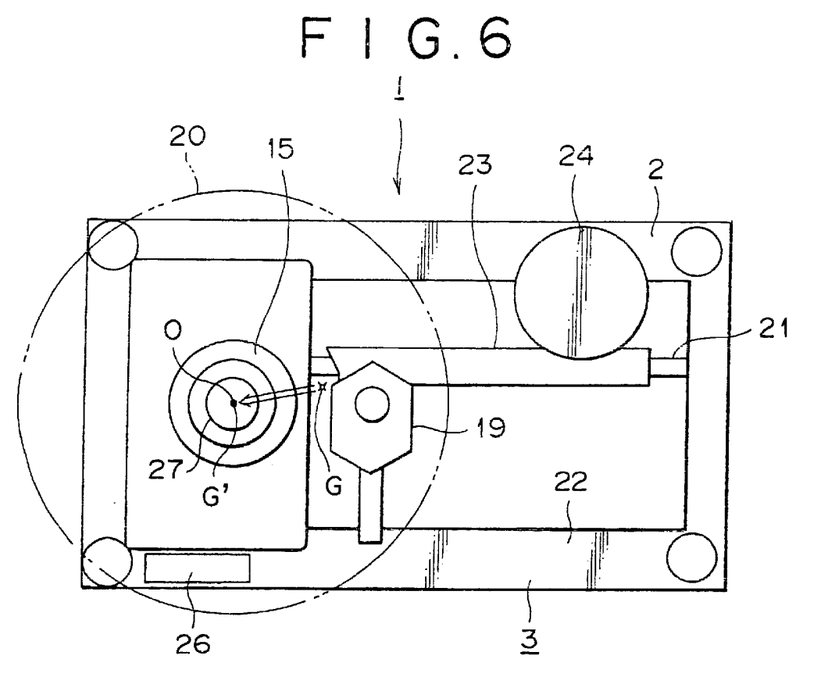
FIG. 6 is a schematic plan view of the disk drive.

A counter weight 26 is disposed on the mechanical chassis 2 on the side opposed to the side on which the optical pickup 19, thread motor 24 and the like are disposed with respect to the rotational center 0 of the spindle motor 6. The disposition of the counter weight 26 allows the center of gravity G' of the drive unit 3 to be in conformity to or in proximity to the rotational center O of the spindle motor 6.

The counter weight 26 is preferably formed by a member having a high density such as laminated steel sheets or a sintered metal member. The counter weight 26 is not necessarily disposed on the mechanical chassis 2 but may be disposed on another portion, for example, on the stator board 7 on which the spindle motor 6 is supported. Also, if part of the counter weight 26 is protruded from the rotational center 0 of the spindle motor 6 to the side on which the optical pickup 19 and the like are disposed, there is no problem insofar as the center of gravity of the counter weight 26 itself is positioned on the side opposed to the side on which the optical pickup 19 and the like are disposed. The shape of the counter weight 26 itself is not particularly limited. Although only one counter weight 26 is provided in this embodiment, a plurality of counter weights may be provided.

In addition, necessary members and parts other than those described above are mounted on the mechanical chassis 2, to constitute the drive unit 3.

The optical disk 20 supported on the turn table 15 is rotated together with the turn table 15 by drive of the spindle motor 6 and the optical pickup 19 is moved in the radial direction of the optical disk 20, to thereby record and/or reproduce signals in and/or from the optical disk 20.

At this time, if vibration occurs resulting from vibration of the optical disk 20 supported on the turn table 15, the balance balls 18 of the self-aligning mechanism 16 are moved to such positions as to cancel the unbalance of the optical disk 20, to eliminate or reduce the above vibration.

As described above, in the optical disk drive 1 of the present invention, since the counter weight 26 is disposed on the mechanical chassis 2 on the side opposed to the side on which the optical pickup 19, thread motor 24 and the like are disposed with respect to the rotational center O of the spindle motor 6, the center of gravity G' of the drive unit 3 is, as shown in FIG. 6, in conformity to or in proximity to the rotational center O of the spindle motor 6. Accordingly, the orbit of vibration caused by the unbalance of the optical disk 20 becomes a circular orbit, to allow the self-aligning mechanism 16 to readily, certainly achieve the aligning function thereof.

Figure 7:
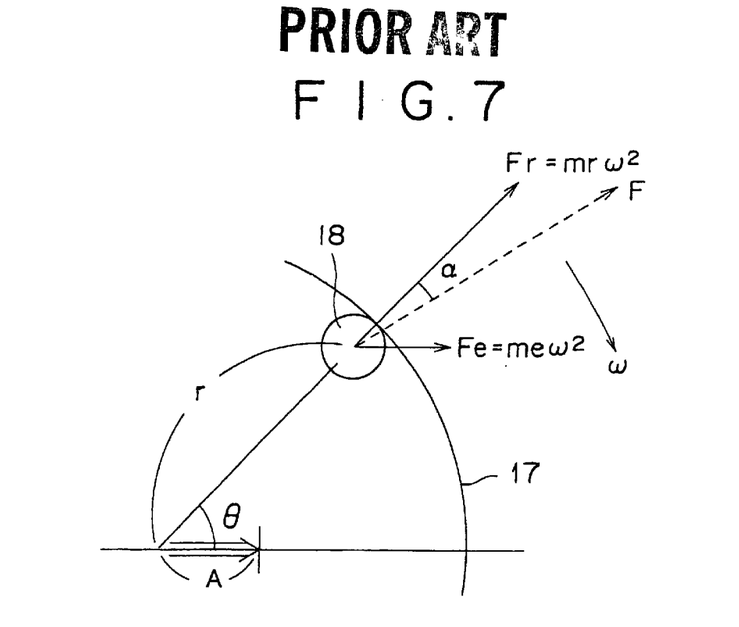
FIG. 7 is a diagram illustrating an effect of the orbit of vibration exerted on a self-aligning mechanism.

The reason for this will be described with reference to FIG. 7.

The balance ball 18 receives a centrifugal force expressed by $Fr=mr\omega^2$ caused by rotation of the housing 17, and a force expressed by $Fe=me\omega^2$ caused by vibration of the drive unit 3.

In the above equations, "m" designates the mass of the balance ball 18; "r" is the revolution radius of the balance ball 18 when the balance ball 18 is positioned on the bottom of the housing 17; "A" is an amplitude of vibration of the drive unit 3; and $\omega$ is a rotational number of the spindle motor 6.

In a state in which only the spindle motor 6 is rotated, only the centrifugal force Fr is exerted on the balance ball 18, so that the balance ball 18 is only pressed on the inner peripheral surface of an outer wall of the housing 17. In such a state, however, if the drive unit 3 is vibrated to produce the force "$F_A$", a resultant force F, which is offset from the centrifugal force Fr by a deviation angle $\alpha$, is produced. As a result, the balance ball 18 is moved in the peripheral direction, to thus adjust the balance.

However, in practice, since there is a rolling friction coefficient $\mu$ between the balance ball 18 and the housing 17, the balance ball 18 cannot be moved unless the deviation angle $\alpha$ satisfies a relationship of $\mu<\tan \alpha$.

Here, the deviation angle$\alpha$ can be expressed by $\alpha=\sin^{-1}$ ("$F_A$"$\sin\theta/F$) ($\theta$: angle formed between Fr and "$F_A$").

Accordingly, as the force Fe produced by vibration of the drive unit 3 becomes larger, the allowable rolling friction coefficient $\mu$ becomes larger.

In the case where the center of gravity G of the drive unit "h" is largely shifted from the rotational center of the optical disk "e" as in the related art disk drive, the orbit of vibration of the axis becomes the elliptical orbit "o". As a result, the force $F_A$ in the major direction of the ellipse becomes larger to increase the allowable rolling friction coefficient, so that the balls "n" can move easily, thereby making easy the operation of the self-balancing device I; however, since the force $F_A$ in the minor direction of the ellipse becomes smaller to decrease the allowable rolling friction coefficient, the balls "n" are hard to move, thereby making hard the operation of the self-balancing device I.

Conversely, in the optical disk drive 1 of the present invention, since the counter weight 26 is disposed on the mechanical chassis 2 on the side opposed to the side on which the optical pickup 19, thread motor 24 and the like are disposed with respect to the rotational center O of the spindle motor 6, the center of gravity G' of the drive unit 3 is in conformity to or in proximity to the rotational center of the optical disk 20, that is, the center O of the spindle shaft 9. Accordingly, the orbit of vibration of the rotational center of the optical disk 20 can be changed from the elliptical orbit into a substantially circular orbit 27, so that the force $F_A$ is made stable in any phase direction, to thereby make easy the operation of the self-aligning mechanism 16.

In the above embodiment, the self-aligning mechanism 16 includes the ring-like housing 17 and a plurality of balance balls 18 movably disposed in the housing 17; however, the self-aligning mechanism is not limited thereto but may be configured into any form insofar as it has a balance member which is moved, if there occurs vibration caused by unbalanced center of gravity of a rotating body, in the direction for compensating for the unbalanced center of gravity.

While in the above embodiment the present invention is applied to an optical disk drive for recording and/or reproducing information in and/or from an optical disk, the present invention is not limited thereto but may applied to a disk drive employing another type of a recording medium disk.

It should be noted that the description of the shapes and structures of respective parts in the above embodiment is for illustrative purposes only for carrying out the present invention, and therefore, the technical scope of the present invention must not be restrictively interpreted on the basis of these specific terms.

What is claimed is:

1. A disk drive, comprising:

a drive unit including a mechanical chassis, a spindle motor for rotating a turn table on which a recording medium disk is supported, and a pickup movable in the radial direction of said recording medium disk supported by said turn table for reproducing and/or recording signals from and/or in said recording medium disk;

a base chassis for supporting said drive unit via an elastic body;

a self-aligning mechanism including a holder rotatable together with a rotor portion of said spindle motor and a balance member movable in said holder;

a counter weight disposed at a position suitable to allow the center of gravity of said drive unit to be located in conformity to or in proximity to the rotational center of said spindle motor;

wherein said counter weight is disposed on a side of the mechanical chassis opposite said pickup and spindle motor, and wherein said counter weight is a plurality of counter weights.

2. A disk drive according to claim 1, wherein said holder of said self-aligning mechanism is a ring-like housing, and said balance member is a plurality of balance balls movably disposed in said housing.

3. A disk drive according to claim 1, wherein a portion of said counter weight protrudes from the rotational center of the spindle motor to the side upon which the pickup is located.

4. A disk drive, comprising:

a drive unit including a mechanical chassis, a spindle motor for rotating a turn table on which a recording medium disk is supported, and a pickup movable in the radial direction of said recording medium disk supported by said turn table for reproducing and/or recording signals from and/or in said recording medium disk;

a base chassis for supporting said drive unit via an elastic body;

a self-aligning mechanism including a holder rotatable together with a rotor portion of said spindle motor and a balance member movable in said holder;

a counter weight disposed at a position suitable to allow the center of gravity of said drive unit to be located in conformity to or in proximity to the rotational center of said spindle motor;

wherein said counter weight is disposed on a side of the mechanical chassis opposite said pickup and spindle motor, and wherein said counter weight is disposed on a stator board.

5. A disk drive according to claim 4, wherein a portion of said counter weight protrudes from the rotational center of the spindle motor to the side upon which the pickup is located.

6. A disk drive according to claim 4, wherein said holder of said self-aligning mechanism is a ring-like housing, and said balance member is a plurality of balance balls movably disposed in said housing.

* * * * *